No. 825,418. PATENTED JULY 10, 1906.
E. RIVETT.
BALL BEARING.
APPLICATION FILED OCT. 26, 1905.
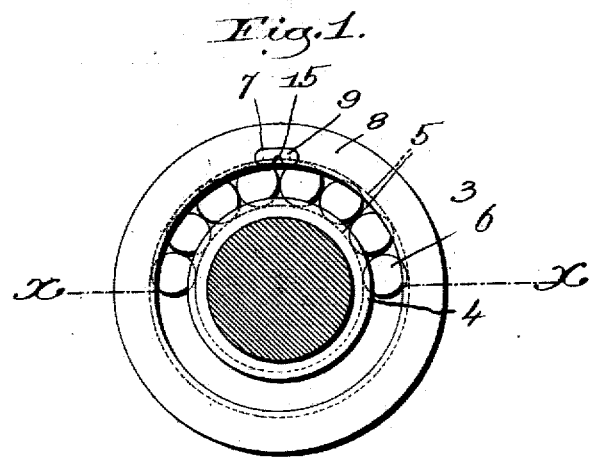
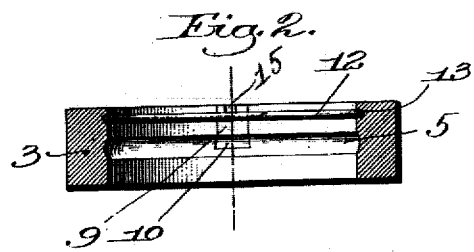
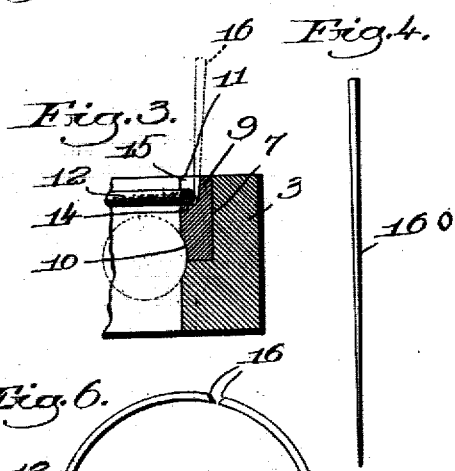
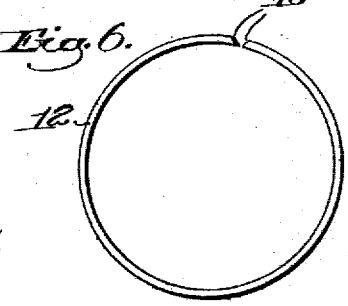
Witnesses:
Fred S. Greenleaf.
Walter K. Trott.
Inventor.
Edward Rivett,

UNITED STATES PATENT OFFICE.

EDWARD RIVETT, OF BOSTON, MASSACHUSETTS.

BALL-BEARING.

No. 825,418.  Specification of Letters Patent.  Patented July 10, 1906.

Application filed October 26, 1905. Serial No. 284,415.

*To all whom it may concern:*

Be it known that I, EDWARD RIVETT, a citizen of the United States, residing at Boston, in the county of Suffolk and State of Massachusetts, have invented an Improvement in Ball-Bearings, of which the following description, in connection with the accompanying drawings, is a specification, like numerals on the drawings representing like parts.

This invention relates to ball-bearings, and has for its object to provide such a bearing with novel means for retaining the balls in the ball-race.

The features of the invention will be more fully hereinafter described and then pointed out in the claims.

In the drawings, Figure 1 is a side elevation of the essential elements of a ball-bearing, showing my invention applied thereto. Fig. 2 is a section on the line $x\ x$, Fig. 1. Fig. 3 is a detail view showing the manner of removing the locking-ring for the ball-race key. Fig. 4 is a view of an implement used in removing said locking-ring. Fig. 5 is a perspective view of the ball-retaining key; and Fig. 6 is a view of the locking-ring.

The ball-bearing herein illustrated comprises the two annular members 3 and 4, each having a ball-race 5 therein, in which the balls 6 may travel. Either the member 3 or the member 4 may be the rotary member. The member 3 is shown as having a ball-supply groove 7 leading from the side face 8 thereof parallel to the axis of rotation and terminating at the ball-race. The inner extremity of the groove is substantially at the center line of the ball-race, although in practice it will be necessary to make it extend sufficiently below the center to permit the balls to be inserted. This ball-supply groove is normally closed by a ball-retaining key 9, which fills the groove and has its inner end 10 shaped to conform to the ball-race, and its outer end 11 flush with the side 8 of the member 3. The ball-retaining key 9 is made removable, and when it is removed the balls 6 may be readily dropped into the race through the ball-supply groove 7; the balls as they enter the race each being moved laterally therein to make room for the next ball. The placing of the balls in the race is accomplished while the two members 3 and 4 are in proper relative position. After the balls are inserted the ball-retaining key 9 is placed in the ball-supply groove 7, thereby to hold the balls in place.

To prevent the key from becoming dislodged, I employ a spring-ring 12, which occupies an annular groove 13 in the inner face of the bearing member 3, said groove being situated sufficiently above the ball-race so that the ring 12 will not interfere with the operation of the balls. The spring-ring also enters a groove 14 in the inner face of the ball-retaining key 9, and thereby locks the key in place. In order to permit the ready removal of said spring-ring in case it is desired to remove the key 9, I have provided said key with a groove or recess 15, extending transversely to the groove 14, in which groove 15 the pointed end of an implement 160 may be inserted to pry the spring-ring out of its seat. The ends of the ring are preferably undercut, as shown at 16, so that the ring may be picked out of its groove by inserting the pointed end of an implement underneath either one of the undercut ends of said ring.

In making the above invention my object has been to provide a construction in which the minimum amount of material is removed in the forming of the ball-supply groove or the groove for receiving the ball-retaining key, and also to provide a construction for retaining the key in place which does not in any way weaken either of the bearing members. It will be noted that the ball-supply groove 7 extends only partially through the bearing member 3 and that the presence of the groove 13 in said bearing 3 does not weaken it any. The ball-supply groove 7 is made as small as possible and yet permit the balls to be readily inserted into the ball-race. Furthermore, both the ball-retaining key and the means for holding said key in place are located within the bearing, and none of these parts project beyond the faces of the bearing. This makes a construction which is especially adapted for use in automobiles and other places where a ball-bearing of maximum strength but occupying a minimum space is desired. One of the advantages of this construction is that when the bearing member is rotating rapidly the centrifugal force tends to more firmly seat the ring 12 in its groove.

Having fully described my invention, what I claim as new, and desire to secure by Letters Patent, is—

1. In a ball-bearing, an annular bearing member having an interior annular ball-race and a ball-supply groove extending parallel to the axis of rotation and leading to said ball-race, a ball-retaining key removably sustained in said groove, and a spring-ring occupying an annular groove in the interior of the bearing member and seated in a transverse groove on the inner face of the key.

2. In a ball-bearing, an annular bearing member having an interior annular ball-race and a ball-supply groove extending parallel to the axis of rotation and leading to said ball-race, a ball-retaining key removably sustained in said groove, and a spring-ring occupying an annular groove in the interior of the bearing member and seated in a transverse groove on the inner face of the key, said key having an implement-receiving groove extending transversely to the spring-ring to afford means for the insertion of an implement behind said ring for removing the latter.

In testimony whereof I have signed my name to this specification in the presence of two subscribing witnesses.

EDWARD RIVETT.

Witnesses:
  LOUIS C. SMITH,
  ELIZABETH R. MORRISON.